Dec. 7, 1926.

A. MOORHOUSE 1,609,527

MOTOR VEHICLE

Filed July 5, 1923

Inventor:
Alfred Moorhouse,
By Milton Tibbetts
Attorney.

Patented Dec. 7, 1926.

1,609,527

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed July 5, 1923. Serial No. 649,435.

This invention relates to motor vehicles and particularly to the brake operating mechanism thereof.

One of the objects of the invention is to provide a brake operating mechanism having simple and accessible adjusting means.

Another object of the invention is to provide a brake operating shaft between the frame and the axle with adequate means for lubricating the movable parts of the shaft.

Another object of the invention is to provide a brake operating shaft having an operating arm, with means for adjusting the angularity of the arm relative to the shaft.

Other objects of the invention will appear from the following description taken in connection with the drawings, which form a part of this specification, and in which.

Figure 1:
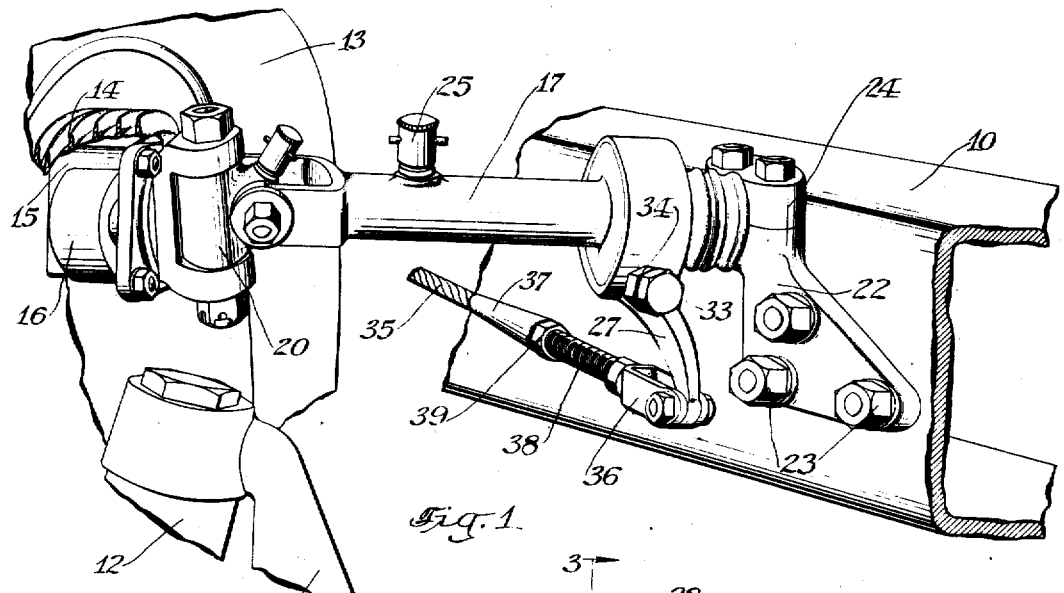
Fig. 1 is a perspective view of the forward part of a motor vehicle with one embodiment of my invention mounted thereon.

Referring to the drawings, 10 represents a part of the forward end of a motor vehicle frame and 11 is the steering axle upon which the frame is mounted through springs in the usual way. A steering knuckle 12 is pivoted upon the end of the axle 11 and a wheel 13 is mounted in the usual way on the steering knuckle. This wheel has a brake flange 14 and a brake shoe 15 is suitably mounted on the steering knuckle part of the axle. In Fig. 1 the end of the brake shoe 15 is shown and it is understood that there are usually two of these shoes between the ends of which a cam 16 is arranged for seperating them and thereby pressing them against the interior surface of the brake drum 14 on the wheel.

The brake cam 16 is adapted to be operated by a brake shaft 17 which, in the present invention, extends from the frame to the axle so that it may be suitably operated by a pedal or hand lever mounted on the frame.

As shown this brake shaft 17 is formed in two parts, parts 18 and 19, these parts being telescoped one within the other to provide for slight elongation of the shaft as the steering knuckle 12 is moved on its pivot in steering the vehicle. The part 18 of this shaft is connected to the cam 16 through a universal joint 20, this joint being mounted approximately in line with the axis about which the steering knuckle 12 is pivoted so that there will be very little change in the position of the shaft 17 when the steering knuckle is moved.

Figure 2:
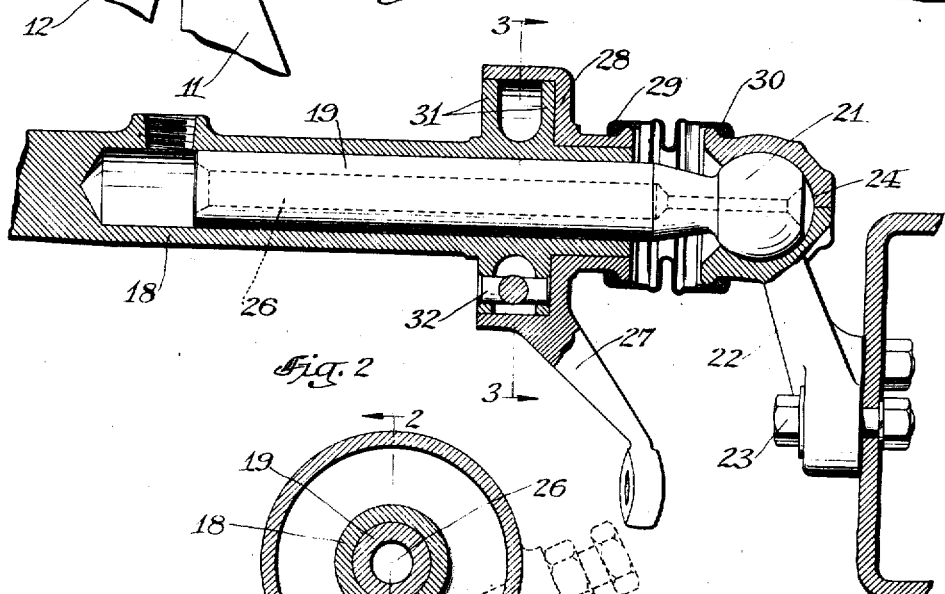
Fig. 2 is a longitudinal sectional view through the brake operating shaft shown in Fig. 1, the section being substantially on the line 2—2 of Fig. 3.

The end of the part 19 which projects from the part 18 is formed with a ball head 21 as shown particularly in Fig. 2 and this head is mounted in a bracket 22 secured to the frame 10 as by the bolts 23. The socket part of this bracket is formed in two pieces bolted together as shown at 24, so that it may sufficiently surround the ball 21 to retain the part 19 against endwise displacement and thereby support one end of the shaft 17 on the frame. The ball is free to turn in its socket so that the shaft 19 may oscillate and so that the shaft may also turn about its longitudinal axis.

The part 18 of the brake shaft is provided with means indicated at 25 for supplying lubricant, such as grease, to its interior. The device 25 is the connection for a grease gun and when the grease is fed to the interior of the part 18 it not only lubricates the bearing surfaces between the parts 18 and 19 but some of it also passes through a conduit 26 formed in the part 19 and into the socket of the bracket 22 to thereby lubricate the ball and socket joint.

An arm for operating the brake shaft 17 is indicated at 27. This arm has a sleeve mounted upon the part 18 of the shaft 17, this sleeve being indicated at 28. A dust cover formed of some flexible material such as leather, is secured at one end to the sleeve 28, as shown at 29, and at the other end to the bracket 22 as shown at 30. By this means the lubricant which is fed to the shafts is retained and dust is prevented from getting to the rubbing surfaces.

Figure 3:
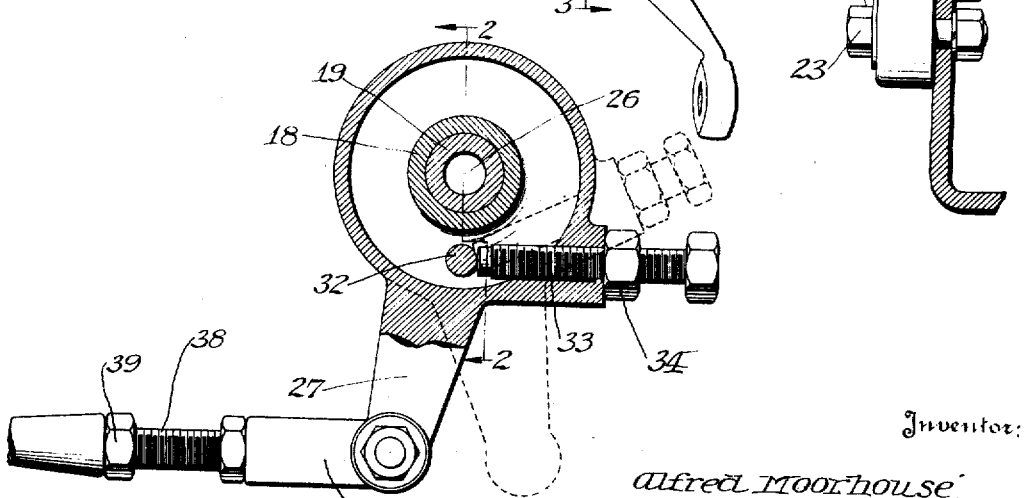
Fig. 3 is a transverse section on the line 3—3 of Fig. 2.

The sleeve 28 surrounds a pair of spaced flanges 31 on the part 18 of the brake shaft and an abutment in the form of a pin 32 is arranged between these flanges as shown in Figs. 2 and 3, to thereby provide for adjustment of the arm 27 relative to the shaft. A bolt 33 is mounted in the sleeve part 28 of the arm, tangentially thereof so that its end strikes against the abutment or pin 32, as shown in Fig. 3. By rotating this threaded bolt the arm 27 is moved angularly relatively to the part 18 of the shaft. A lock nut 34 secures the bolt in its adjusted position.

In Fig. 3 the brake operating shaft is shown in full lines in one position and in dotted lines the bolt 33 has been so adjusted as to move the arm 27 angularly of the part 18 of the shaft. By reason of the bolt 33 extending between the flanges 31 the sleeve 28 is retained in position on the shaft. It may be improved by removing the bolt 33 after the shaft has been disconnected from the vehicle frame.

Means for operating the arm 27 are shown in the form of a cable 35 which is connected to the arm 27 by an adjustable clevis 36. The end of the cable 35 is secured in a threaded socket 37 into which the threaded part 38 of the clevis 36 extends. A lock nut 39 secures the clevis in adjusted position.

Stretch of the cable 35 may be taken up by the adjustable clevis as indicated above, but if wear of the brake shoes is also taken up by this means the angularity of the arm 27 will soon be such that its effect in operating the brake shaft will be changed. Therefore, to restore the arm to its original angularity relative to the brake shaft, after the cam or the brake shoes have worn, the adjusting bolt 33 is operated.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, a brake operating shaft comprising two parts, an arm for operating said shaft mounted on one of said parts, means for adjusting said arm angularly relative to the part upon which it is mounted and for maintaining the axial position of the arm on said part.

2. In a motor vehicle, the combination with the frame and the axle, of a brake shoe mounted on the axle, a bracket on the frame, a two-part telescope shaft having one end mounted in said bracket and having the other end mounted on the axle to operate said brake shoe, an operating arm rotatably mounted on said shaft, means including a bolt for angularly adjusting said arm relative to said shaft, and spaced flanges on the shaft co-operating with the bolt to axially position said arm.

3. A brake operating mechanism comprising a bracket, a two-part shaft having one of its parts mounted in said bracket, a sleeve supported on the other said part and adjustable relatively thereto and a dust cover extending between said bracket and said sleeve.

4. A brake operating mechanism comprising a shaft, a sleeve on said shaft, an abutment arranged radially of the shaft, a bolt threaded into said sleeve and arranged tangentially, the end of said bolt adapted to strike said abutment and adjust the sleeve relatively to the shaft.

5. A brake operating mechanism comprising a shaft having two separated radial flanges, an operating arm having a sleeve surrounding said flanges, an abutment connecting said flanges, and a bolt threaded in said sleeve and adapted to bear against said abutment to adjust the arm angularly relative to said shaft.

6. A brake operating mechanism comprising a shaft having a pair of spaced radial flanges, an operating arm having a part surrounding said flanges, and a bolt threaded in said arm and extending between said flanges, said bolt adapted to adjust the arm angularly relative to said shaft and to prevent endwise movement of the arm on the shaft.

In testimony whereof I affix my signature.

ALFRED MOORHOUSE.

lock nut 34 secures the bolt in its adjusted position.

In Fig. 3 the brake operating shaft is shown in full lines in one position and in dotted lines the bolt 33 has been so adjusted as to move the arm 27 angularly of the part 18 of the shaft. By reason of the bolt 33 extending between the flanges 31 the sleeve 28 is retained in position on the shaft. It may be improved by removing the bolt 33 after the shaft has been disconnected from the vehicle frame.

Means for operating the arm 27 are shown in the form of a cable 35 which is connected to the arm 27 by an adjustable clevis 36. The end of the cable 35 is secured in a threaded socket 37 into which the threaded part 38 of the clevis 36 extends. A lock nut 39 secures the clevis in adjusted position.

Stretch of the cable 35 may be taken up by the adjustable clevis as indicated above, but if wear of the brake shoes is also taken up by this means the angularity of the arm 27 will soon be such that its effect in operating the brake shaft will be changed. Therefore, to restore the arm to its original angularity relative to the brake shaft, after the cam or the brake shoes have worn, the adjusting bolt 33 is operated.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, a brake operating shaft comprising two parts, an arm for operating said shaft mounted on one of said parts, means for adjusting said arm angularly relative to the part upon which it is mounted and for maintaining the axial position of the arm on said part.

2. In a motor vehicle, the combination with the frame and the axle, of a brake shoe mounted on the axle, a bracket on the frame, a two-part telescope shaft having one end mounted in said bracket and having the other end mounted on the axle to operate said brake shoe, an operating arm rotatably mounted on said shaft, means including a bolt for angularly adjusting said arm relative to said shaft, and spaced flanges on the shaft co-operating with the bolt to axially position said arm.

3. A brake operating mechanism comprising a bracket, a two-part shaft having one of its parts mounted in said bracket, a sleeve supported on the other said part and adjustable relatively thereto and a dust cover extending between said bracket and said sleeve.

4. A brake operating mechanism comprising a shaft, a sleeve on said shaft, an abutment arranged radially of the shaft, a bolt threaded into said sleeve and arranged tangentially, the end of said bolt adapted to strike said abutment and adjust the sleeve relatively to the shaft.

5. A brake operating mechanism comprising a shaft having two separated radial flanges, an operating arm having a sleeve surrounding said flanges, an abutment connecting said flanges, and a bolt threaded in said sleeve and adapted to bear against said abutment to adjust the arm angularly relative to said shaft.

6. A brake operating mechanism comprising a shaft having a pair of spaced radial flanges, an operating arm having a part surrounding said flanges, and a bolt threaded in said arm and extending between said flanges, said bolt adapted to adjust the arm angularly relative to said shaft and to prevent endwise movement of the arm on the shaft.

In testimony whereof I affix my signature.

ALFRED MOORHOUSE.

Certificate of Correction.

Patent No. 1,609,527, granted December 7, 1926, to

ALFRED MOORHOUSE.

It is hereby certified that error appears in the printed specification of the above-mentioned patent requiring correction as follows: Page 2, line 10, for the word "improved" read *removed;* and that the said Letters Patent should be read with this correction therein that the same may conform to the record of the case in the Patent Office.

Signed and sealed this 22d day of February, A. D. 1927.

[SEAL.]
M. J. MOORE,
*Acting Commissioner of Patents.*

Certificate of Correction.

Patent No. 1,609,527, granted December 7, 1926, to

ALFRED MOORHOUSE.

It is hereby certified that error appears in the printed specification of the above-mentioned patent requiring correction as follows: Page 2, line 10, for the word "improved" read *removed;* and that the said Letters Patent should be read with this correction therein that the same may conform to the record of the case in the Patent Office.

Signed and sealed this 22d day of February, A. D. 1927.

[SEAL.]

M. J. MOORE,
*Acting Commissioner of Patents.*